Figure 1:
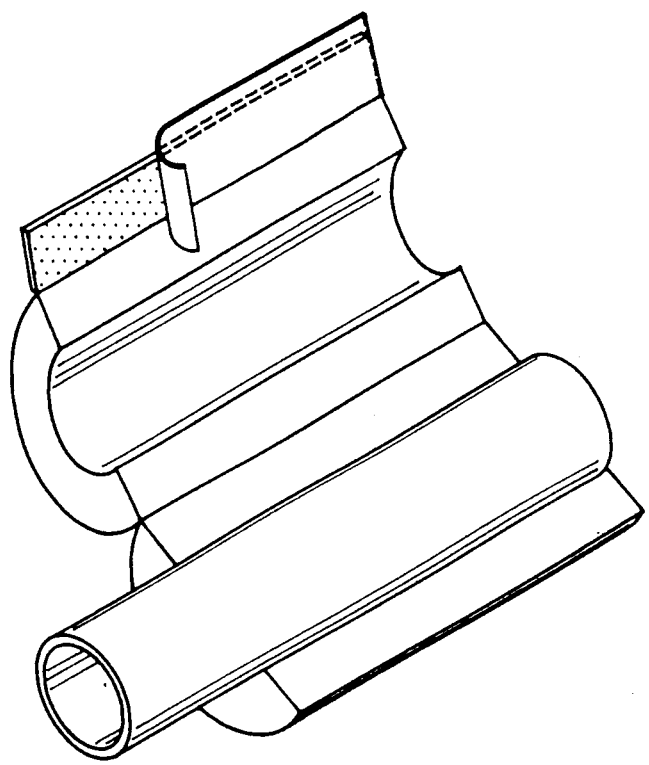

United States Patent [19]

Knittel et al.

[11] Patent Number: 4,996,088
[45] Date of Patent: Feb. 26, 1991

[54] STORAGE STABLE ADHESIVE AND ITS LAMINATES

[75] Inventors: Gerald H. Knittel, Brecksville; Stanley D. Smith, Northfield; Richard C. Spector, Akron; Jack M. McClintock, Stow, all of Ohio

[73] Assignee: Morgan Adhesives Co., Stow, Ohio

[21] Appl. No.: 249,119

[22] Filed: Sep. 26, 1988

[51] Int. Cl.$^5$ ............................................. A61F 13/02
[52] U.S. Cl. ..................................... 428/40; 428/349; 428/353; 428/447; 428/304.4; 524/267; 524/268; 525/100; 528/10; 528/43
[58] Field of Search ............. 428/40, 349, 353, 304.4, 428/447; 525/100; 524/267, 268; 528/10, 43

[56] References Cited

U.S. PATENT DOCUMENTS

| | | | |
|---|---|---|---|
| 4,022,248 | 5/1977 | Hepner et al. | 428/40 |
| 4,584,217 | 4/1986 | McClintock | 428/40 |
| 4,735,829 | 4/1988 | Hirose et al. | 428/447 |

Primary Examiner—Edith Buffalow
Attorney, Agent, or Firm—Oldham & Oldham

[57] ABSTRACT

An improved shelf life composition useful as adhesives and, especially, pressure sensitive adhesives is made by mixing an acrylic composition with a catalyst of the tin type and a non-reactive silicone composition essentially free of hydroxyl and hydrogens on the silicon atoms and of the formula shown hereinafter.

6 Claims, 1 Drawing Sheet

STORAGE STABLE ADHESIVE AND ITS LAMINATES

TECHNICAL FIELD

This invention relates to a method of making an adhesive composition having improved shelf life, to said adhesive compositions and the laminate produced with said adhesive. More particularly, this invention relates to a method of making an adhesive that can be spread on two surfaces and the surfaces at a later date can be brought into contact to join said surfaces as an adhered and fixed laminate. Specifically, this method comprises mixing, on a weight basis, an acrylic adhesive with 1 to 10 percent, and preferably about 4 to 6 percent, of a catalyst, such as an organic tin compound and 1 to 10 percent, and preferably 4 to 6 percent, of a non-reactive organic silicone of the formula

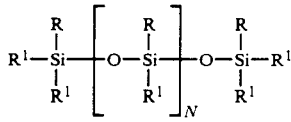

where R and $R^1$ are alkyl, cycloalkyl and aryl and N has values of about 10 to 10,000 and preferably about 16 to 130. The higher molecular weight silicones, having a viscosity at 15° C. of 1,000 to 60,000 cps, have less tendency to migrate. The laminate can be made of the same or different substrates such as metal, fabric, film, plastic, silica-containing materials, such as glass or rock wool, and wood.

BACKGROUND ART

Acrylic compositions are widely known and used as adhesives in the field of pressure sensitive and heat sensitive adhesives as shown by the following patents: U.S. Pat. Nos. 4,182,644 to Paul C. Briggs, Jr., 3,890,407 to Paul C. Briggs, Jr., 3,616,040 and 3,591,438 or 3,890,407 to Alex S. Toback. U.S. Pat. No. 4,602,073 prepares a two-part acrylic adhesive. Likewise, U.S. Pat. No. 4,600,738 teaches methods of making a two-component acrylic modified polyester adhesive. Unfortunately, these pressure sensitive adhesives are known for their relatively poor initial tackiness and much work has been directed to improving the initial tackiness.

The above enumerated U.S. patents are incorporated herein to disclose how to make pressure sensitive adhesives, hot melt adhesives and other adhesives. As used herein, the term "pressure sensitive adhesive" means the adhesive is tacky at ambient temperature whereas a "hot melt adhesive" is dependent upon temperature elevation, wherein the adhesive becomes tacky only upon temperature elevation.

In the past, many different organic silicones have been added to the acrylic pressure sensitive composition, or copolymers of silicones and acrylics have been made. For instance, Martin M. Sackoff et al. in U.S. Pat. No. 4,151,319 teach the making of a pressure sensitive adhesive by using blends of acrylics and silicones having poly(alkylene oxy)radicals. The data in Sackoff et al.'s Table 1 for peel values at zero and 20 minutes and longer times as well as the face-to-face peel data indicate the silicone acts as an unreactive filler and correspondingly lowers the initial tackiness relative to an all-acrylic pressure sensitive adhesive. Similarly, the Laurent U.S. Pat. No. 4,346,189 teaches the addition of 5 percent or 6 percent of polydimethylsiloxane, wherein the initial tack is not improved, but slitting is easier as the cutting blade or knife does not stick due to silicone release properties.

Figure 2:
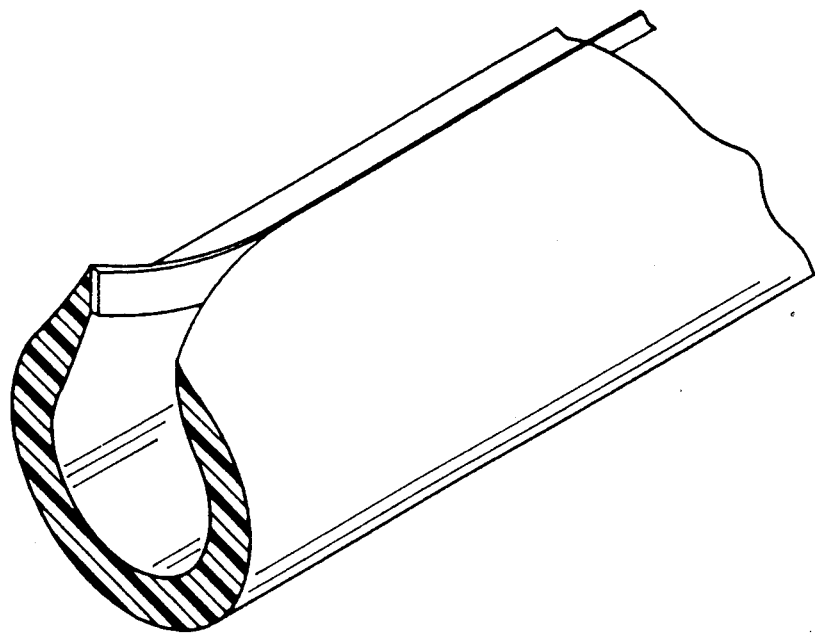

For a better understanding of the invention, reference should be made to the accompanying drawing wherein:

FIG. 2 is a special embodiment of this invention showing a plan perspective view of a piece of pipe wrap insulation in an open position on a pipe. FIG. 3 is another special embodiment of this invention showing a cellular foam pipe insulation unit having a slit therein with adhesive on each face of said slit held from contact by a removable release member positioned in said slit.

DISCLOSURE OF THE INVENTION

Referring to FIG. 1, the insulation has a slit 2 therein to allow insulation to be fitted on pipe 3, a cover or jacket member 4 attached to said insulation and extending past slit face 5 and wherein said faces 5 and 6 of said insulation formed by said slit can be held in contact by a pressure sensitive adhesive sealing the overlapped jacket member 4. To achieve the adhesive seal, the jacket member 4 has a face 7 coated with a pressure sensitive acrylic adhesive mixture containing both the catalyst and the silicone. The coating 8 is juxtapositioned thereon to contact a coated layer 9 of the same pressure sensitive acrylic adhesive mixture positioned on the wrap on the opposite side of the slit. The pressure sensitive adhesive on the joined surfaces forms a fixed adhered laminate. In this case, it anchors the insulation on the pipe. Also, release liners 10 and 11 are usually placed on adhesive coats 8 and 9. For instance, the coats 8 and 9 can be a blend of an acrylic composition, about 0.5 to about 10 percent of an organic polysiloxane and about 0.5 to 10 percent of an organic tin compound or compounds and preferably about 4.2 percent to 6.0 percent of silicone and about 4.5 to 5.0 percent of an organotin compound. The advantages of this pipe wrap are that it permits a smaller amount of coating to be used, usually a total of 3 to 6 gms per 100 sq. inches, and yet adhesion builds faster, and the bond obtained is substantially better than the usual acrylic bond, especially in bond peel strength. Further, it permits the tea bag materials, i.e., the central liner material 20 of FIG. 1 of McClintock U.S. Pat. No. 4,157,410, to be omitted as it possibly wets or coats the irregular surfaces better. Further, this permits the adhesive to be a singular tape construction, such as a self-wound tape, where adhesive coat 9 is initially applied to the opposite side of liner 10 for transfer to the position for coat 9 shown in FIG. 3 of the McClintock above-listed patent.

The two-part system taught by this application would clearly be applicable to the system taught in U.S. Pat. Nos. 4,022,248 and 4,584,217.

Referring to FIG. 2, a cellular foam insulation member 12 is shown having a slit 13 extending from the outersurface 14 to the inside surface 15. It should be obvious this slit does not need to extend all the way through from surface 14 to surface 15 as it may stop before reaching the inner surface 15 as this will hold the insulation together until it is positioned on the pipe. The slit is spread apart to expose face 16 and face 17 formed by slitting the cellular insulation member. An adhesive 18 and 19 is applied to each face of the slit and held from contact by release member 20. Release member 20 is removed at the time the pipe is placed through the slit to rest in the hollow annulus 21 of the foamed insulation member. The slit is closed over the pipe to bring the two faces of the slit into contact and allow the adhesive to adhere and form a bond.

Unexpectedly, we have discovered that the bonding strength of acrylic and especially pressure sensitive acrylic adhesives is improved by incorporation of, or mixing therein, a small amount of a catalyst, usually about 0.5 to 10 percent, preferably 1 to 6 percent, and most preferably 4.2 to 5.5 percent, and a small amount of an organic silicone of the formula described herein before and usually about one to two parts per one part of catalyst give an improved result. Thus, a mixture of a pressure sensitive acrylic adhesive having mixed therein 0.5 to about 10 percent and preferably about 4 to 6 percent of said organic silicone and a catalyst is used in each part of the adhesive. The pressure sensitive acrylic adhesive having about 1 to 5 percent of catalysts, such as the organic tin compounds, viz., those used as catalysts for organic silicones, and about 4 to 6 percent of non-reactive silicone give excellent results.

We have found that, when the adhesive mixtures of this invention are spread on their respective substrates, and then the two parts on their respective substrates are pressed into contact with each other, the contacted adhesives exhibit improved initial bond, and the improvement is much better than the adhesive values that were obtained by the pressure sensitive acrylic adhesive alone.

Thus, unexpectedly, we have learned that, by suitable selection and combination of acrylic compositions with non-reactive, organic silicones of formula described herein, in combination with tin compounds, a new composition is obtained that exhibits surprising and useful properties, particularly greatly enhanced adhesive values. For instance, an acrylic pressure sensitive adhesive can be compounded with a small amount of non-reactive organic silicone that is preferably a liquid in the ambient range and/or is highly compatible with the acrylic composition, and then is mixed with an organic tin compound. This blend can be applied to a substrate, such as metal, plastic, fabric, wood, paper, fiber, glass or a fiberglass substrate, such as, in the mat, sheet or film form. The acrylic pressure sensitive adhesive can be compounded with a small amount of a silicone-curing catalyst, usually about 0.5 to 10 percent and preferably about 10 to 5 percent of said curing catalyst, which preferably is an organic tin compound, to yield a first blend. Then the first blend can be blended with a non-reactive silicone to give the adhesive composition of the invention. When the adhesive composition of this invention is contacted or applied on the first substrate and then on the second substrate and pressed together, there is a significant enhancement of the adhesive value of the bond strength obtained between the first and second substrate, and this result is contrary to what has been previously recognized as silicone usage in pressure sensitive adhesives, i.e., as a release agent and/or an unreactive filler. For instance, the bond strength of one adhesive increased in one series of tests to give significantly greater peel strength.

The acrylics useful in this invention are of several types as set forth hereinafter.

Suitable polymerizable vinyl monomers for the purpose of this invention include acrylic monomers and mixtures of monomers, such as methyl methacrylate, ethyl methacrylate, acrylonitrile, methacronlonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate, itaconic acid, ethylene glycol and higher-glycol acrylates and methacrylates, acrylamide, and methacrylamide; halogenated monomers such as vinylidene chloride, chlorostyrene, 1,2-dichloro-1,3-butadiene, and 2-chloro-1,3-butadiene; and styrene and mono and polyalkylstyrenes, such as methylstyrene, ethylstyrene, or tert-butylstyrene. The preferred monomers are acrylic monomers, especially lower alkyl acrylates and methacrylates and ethylene glycol diacrylate and dimethacrylate and their mixtures.

The choice of the monomer will, of course, depend to some extent on the desired adhesive properties, as well as the solubility or compatibility of the organic silicone. Solutions having a Brookfield viscosity of more than about 1 million cps. (ASTM V 490.0500) are impractical to handle. When rigid assemblies having high shear strength are required, the monomer mixture should have a high glass transition temperature, for example, using methyl methacrylate of a glass transition temperature of 105° C. For more flexible structures, e.g., where the adhesive layer is intended to contribute to vibration dampening at room temperature, a glass transition temperature of the combined copolymer of about $-20°$ C. is preferred. Also, compatible monomers of vinyl acetate may be used to modify the properties thereof. These may be copolymers of acrylates and vinyl acetate, or homopolymers of vinyl acetate.

Sometimes it is desirable to choose monomers that have special end group termination or other structures as shown below which are well known to pressure sensitive adhesive chemists. Examples of these end groups are carboxyl, hydroxyl, amine or amide groups.

Other acceptable monomers which can be used in the adhesives disclosed herein are the well-known acrylate terminated epoxy or ester units, or low molecular weight polymers thereof.

Naturally, any of the above-described acrylate and polyacrylate ester species can be used in combination if desired. Many of the higher molecular weight acrylate esters described above are extremely viscous and advantageously are mixed (diluted) with a low viscosity acrylate ester, such as an alkyl acrylate ester to get the desired compatibility. Also, polyvinyl acetate may be used.

As used herein, the term "polymerizable acrylate ester monomer" includes not only the foregoing monomers in the pure and impure state, but also those other compositions which contain those monomers in amounts sufficient to impart to the compositions the polymerization characteristics of the acrylate esters. It is also within the scope of the present invention to obtain modified characteristics for the cured composition by the utilization of one or more monomers within the above formula with other unsaturated monomers, such as unsaturated hydrocarbons or unsaturated esters.

Generally these acrylic monomers, individually or in mixtures of two or more monomers, are caused to polymerize with suitable peroxy initiators or other well known acrylic polymerization catalysts to give the desired molecular weight or viscosity. Thus, the acrylic composition may be a homopolymer, a copolymer, a terpolymer or like polymer or mixtures. Especially preferred are those acrylics having 0.1 to less than about 1 percent of a monomer copolymerized or terpolymerized therein to give copolyacrylates with reactive hydroxyl or carboxyl groups that can be cross-linked by use of tin, aluminum or titanium chelating agents.

The tin compounds useful in this invention are the well known catalytic organic tin compounds where the tin has a valence of 4 or 2 and generally the organic portion contains alkyls, aryls, cycloalkyls, and alkylates. Those catalyst compounds that are compatible with the acrylic adhesive are preferred.

The acrylic adhesives are commercially available from several companies. Some of the more common ones are designated herein as acrylic adhesive or acrylic adhesive solution as follows (on weight basis):

Acrylic adhesive A contains about 50 to 55 percent by weight of polymer of 2-ethylhexyl acrylate, about 35 to 30 percent by weight of the polymer of ethyl acrylate and varying amounts of polyvinyl acetate, such as about 10 to 20 percent.

Acrylic adhesive B contains about 75 to 80 percent of the polymer of 2-ethylhexyl acrylate and about 25 to 20 percent of a polymer of polyvinyl acetate.

Acrylic adhesive C contains about 51 to 54 percent polymer of 2-ethylhexyl acrylate, 33–35 percent of the polymer of ethylacrylate and 11–16 percent of polyvinyl acetate.

Acrylic adhesive D contains the same composition as adhesive C except the acrylic polymer contains about 0.1 to about 1 percent of a carboxylic group derived from copolymerization of acrylic acid with the monomers of 2-ethylhexyl acrylate and/or ethyl acrylate.

Acrylic adhesive E contains about 21 to 23 percent polyvinyl acetate and about 79 to 77 percent polyethyl acrylate.

Acrylic adhesive F is the same as adhesive B except the acrylate contains about 0.1 to 1 percent and preferably 0.3 to 0.7 percent of a comonomer such as acrylic acid or methacrylic acid to give the polymer about 0.1 to 1 percent of carboxylic acid groups.

Acrylic adhesive G is the same as adhesive A except the acrylate contains about 0.1 to 1 percent and preferably 0.3 to 0.7 percent of a comonomer such as acrylic acid or methacrylic acid to give the polymer about 0.1 to 1 percent of carboxylic acid groups.

The above adhesives generally are dispersed or dissolved in a suitable solvent to give a readily spreadable liquid. These solvents generally are toluene, heptane, cyclohexane, methanol, isopropanol, acetone, methyl ethyl ketone, and the lower esters. The amount of solvent is usually about 40 to 60 percent by weight of the adhesive solution. In use, these adhesives or other acrylic compositions are applied to the release liner in making pressure sensitive adhesives.

After the adhesive is applied to the substrate, the substrate generally is passed through an oven to dry. This drying generally leaves the dried pressure sensitive adhesive coat on the substrate with about 1 to 1.5 percent of retained solvent. The adhesives of this invention coated on substrates and dried as above appear to retain a similar amount of solvent.

With this invention, the adhesives have been found adequate for some substrates and for pipe insulation such as Kraft scrim foil laminate (also known as ASJ material) as referred to generally in the McClintock patents U.S. Pat. Nos. 4,157,419 and 4,584,217 at about 1.5 to 5 gms per 100 sq. inches with optimum values being about 2 to 3 gms per 100 sq. inches.

In an embodiment of this invention wherein the pressure sensitive system contains a silicone and a silicone-curing catalyst, either the silicon or the catalyst may be encapsulated in microspheres. Rupture of the microspheres will initiate the phenomenon that leads to an enhanced adhesive bond. The microspheres have a wide range of size from about 0.1 to 150 or more microns Some encapsulation materials of the catalyst are polyethylene, polyvinylalcohol and gelatin.

The nature of this invention may be more readily understood by reference to the following representative and illustrative examples where all parts and percentages are by weight unless otherwise indicated.

A series of experiments was run using a commercial acrylic adhesive (designated X-24 herein) having a polymer content composed of approximately 52–54 percent 2-ethylhexyl acrylate, 31–34 percent ethyl acrylate and 12–14 percent vinyl acetate as the control and then compounding the control with varying amounts of tin catalyst alone or combined with varying amounts of a silicone polymer of the formula shown on page 1 of this specification to form different test specimens.

Each of these specimens in a solvent, e.g., toluene, preferably 40 to 60 percent by weight were used to coat the substrate. Usually about 1 to 10 grams of dry adhesive per 100 square inches of substrate was used. The coated substrate was oven-dried to give a pressure sensitive adhesive coat on the substrate.

The above specimens were coated on release coated paper liner and dried to give a pressure sensitive adhesive test strip containing 3 gms of adhesive. These strips were tested on a standard direct 90° static peel test apparatus using 168 grams load for the pull test with the pull remaining at the 90° relationship throughout the static peel test. The results of one series of 90° static peel test at 150° F., expressed as inches of movement/24 hours are shown in Table I. Two strips were placed in contact and pressed together by three complete (forward and back) passes of a 4½ pound roller. These data show the catalyst in the adhesive on sides 1 and 2 gave an improved 90° static peel result as the amount of catalyst, viz., dibutyl tin diacetate, increased. About 3.6 to 6.0 percent catalyst gives optimum results.

TABLE I

| EFFECTS OF CATALYST IN X-24 | | | | | |
|---|---|---|---|---|---|
| | A | B | C | D | E |
| X-24 | 100 | 100 | 100 | 100 | 100 |
| Catalyst (Based On Solids) | 0 | 1.2 | 2.4 | 3.6 | 6.0 |
| 90° Static Peel @ 150° F. (Inches/24 Hours) | | | | | |
| Side 1 | | | | | |
| 0° | — | — | — | — | |
| 145 | | | | | |
| 1.2° | 6.2 | 7.0 | 5.5 | 23 | |
| 240 | | | | | |
| 2.4° | 1.8 | 4.1 | 3.5 | — | |
| 127 | | | | | |
| 3.6° | 1.8 | 3.4 | — | — | |
| 95 | | | | | |
| 6.0° | 1.2 | — | — | — | |
| 14 | | | | | |
| 6.0 3.6 2.4 1.2 0 Amount of Catalyst - Side 2 | | | | | |

EXAMPLE 2

In this example, specimens were made using the control adhesive X-24 with 5 percent of dibutyl tin diacetate with varying amounts of Dow Corning DC-200, a trimethyl silicon terminated silicone, as set forth in the results of Table II. Various standard peel tests as indicated in Table II were run on specimens A to E. In Table II the amount of dibutyl tin diacetate is held constant at 5 percent while DC-200 in the specimen varies from 0.5 to 10.0 percent. G. E.'s SF-96 silicones gave equivalent results.

TABLE II

VARIOUS LEVELS OF DC-200 (350 CPS) IN X-24

|  | A | B | C | D | E |
|---|---|---|---|---|---|
| Adhesive | 100 | 100 | 100 | 100 | 100 |
| DC-200 | 0.6 | 3.0 | 5.0 | 9.8 | 13.4 |
| Catalyst* | 5 | 5 | 5 | 5 | 5 |
| 90° Static Peel (Inches movement/24 hours) | | | | | |
| Initial | 1.1 | 1.5 | 1.0 | 1.0 | 1.0 |
| 1 Wk. @ 140° F. | 700 | 285 | 96 | 88 | 75 |
| 30 Minute Peel (LBS/IN) | | | | | |
| Initial | | | | 3.1 | 3.2 |
| 1 Wk. @ 140° F. | | | | 2.5 | 2.5 |
| 2 Wks. @ 140° F. | | | | 1.7 | 1.6 |
| 24 Hour Peel (LBS/IN) | | | | | |
| Initial | | | | 5.5 | 5.5 |
| 1 Wk. @ 140° F. | | | | 3.2 | 3.2 |
| 2 Wks. @ 140° F. | | | | 2.2 | 2.3 |
| Quick Tack (LBS/SQ. IN) | | | | | |
| Initial | | | | 1.6 | 1.4 |
| 1 Wk. @ 140° F. | | | | 1.3 | 1.4 |
| 2 Wks. @ 140° F. | | | | 1.2 | 0.9 |

*The Catalyst was dibutyltin diacetate.

These experiments show that the 90° static peel, after one week at 140° F. improves with the higher silicone content but essentially levels out at about 5 to 10 percent silicone at a 5 percent tin catalyst level.

It was noted in the experiments of Table II that the DC-200 migrated to the surface during 140° F. heat aging. Therefore, the experiments shown in Table IV were run at 4.9 percent dibutyl tin diacetate using varying amounts of silicones of the formula of page 1 but of different molecular weight as indicated by their viscosity values. A comparison of specimens B, D and F of Table IV and specimen C of Table II indicates that silicones having viscosities of about 1,000 to 5,000 cps at 25° F. give the better peel test results with heat aging. Also, those silicones having a viscosity greater than 500 and up to 1000 were relatively free of a tendency to migrate during heat aging, while those greater than 1,000 to about 5,000 cps viscosities at 25° C. were considered satisfactory to excellent in this regard.

In Table III the silicone, DC-200, was used at 2.4 parts per 100 parts of adhesive X-24 with varying amounts of catalyst. These experiments indicated improvement with increasing amounts of catalyst even at relatively low silicone usage.

TABLE III

EFFECT OF CATALYST LEVEL IN X-24 ADHESIVE WITH TACKIFIER 350

|  | A | B | C | D | E |
|---|---|---|---|---|---|
| X-24 | 100 | 100 | 100 | 100 | 100 |
| DC-200 | 2.4 | 2.4 | 2.4 | 2.4 | 2.4 |
| Catalyst (Based on Solids) | 1.0 | 3.2 | 4.9 | 6.1 | 10 |
| 30 Minute Peel (LBS/IN) | | | | | |
| R.T. | 4.4 | 3.6 | 3.2 | 1.4 | 0.2 |
| Quick Tack (LBS/SQ. IN) | | | | | |
| R.T. | 4.0 | 3.0 | 2.8 | 0.9 | 0.6 |
| 90° Static Peel (150° F.) Inches Movement/24 Hours | | | | | |
| 1. R.T. Initial | 23 | 1.3 | 1.1 | 0.25 | 0.25 |
| 2. 1 Wk. @ 140 ± F. Aging | 1,000 | 380 | 340 | 47 | 3.6 |

TABLE IV

EFFECT OF INCREASING MOLECULAR WEIGHT OF SILICONES

|  | Control A | B | C | D | E | F | G |
|---|---|---|---|---|---|---|---|
| X-24 | 100 | 100 | 100 | 100 | 100 | 100 | 100 |
| Catalyst | 4.9 | 4.9 | 4.9 | 4.9 | 4.9 | 4.9 | 4.9 |
| 350 cps | 2.4 | | | | | | |
| 5,000 cps | | 4.8 | 1.2 | | | | |
| 100,000 cps | | 4.8 | | 1.2 | | | |
| 600,000 cps | | 4.8 | | | 1.2 | | |

| 90° Static Peel @ 150° F. (Inches Movement/24 Hour) | | | | | | | |
|---|---|---|---|---|---|---|---|
|  | A | B | C | D | E | F | G |
| Initial, R.T. | 1.1 | 0.3 | 0.6 | 1.4 | 0.9 | 1.0 | 0.6 |
| 1 Wk @ 140° F. Aging | 340 | 75 | 216 | 146 | 212 | 220 | 105 |

TABLE V

CATALYST SYSTEMS WITH X-24 ADHESIVE
(5 Parts Catalyst to 100 Parts X-24 Adhesive)

90° Static Peel at 150° F.

| Inches/24 Hours | Catalyst |
|---|---|
| 3 | Dibutyl Tin Diacetate (XY-176) |
| 10 | Dibutyl Tin Bis (2-Ethyl Hexanoate) D.C. 23A |
| 44 | Dibutyl Tin Dilaurate (D.C. DC-176) |
| 90 | Dibutyl Tin (isocetyl Mercaptoacetate) M&T 131 |
| 145 | X-24/X-24 - Control |

In Table V the 90° static peel test results are shown with different catalysts added to acrylic adhesive X-24 at the rate of 5 parts catalyst per 100 parts of adhesive X-24.

These tests indicate that the lower molecular weight tin carboxylates appear to be more effective than those of the higher molecular weight acids such as lauric acid.

The peel tests were run by the method designated as PSTC-1 except the residence times prior to peeling the test strips were 30 minutes or 24 hours. The Quick Tack test was run using 2-mil-thick polyester loop as described hereinafter.

Select an unwrinkled area to obtain specimens from the samples. Die cut 1×5 inch pieces (5 test specimens are needed). Lay the specimen face down on a flat surface and carefully remove the backing paper. Take a 2½ inch piece of ¾" masking tape, center it, and place it adhesive side down so that it is even with the end of the specimen and perfectly perpendicular (see series of illustrations in FIG. 1). Pick the specimen up and bring the free end up even with the taped end face to face forming a loop with adhesive out. Carefully fold the masking tape over to hold the loop together. This is a finished test specimen and from a side view should have the shape of a teardrop. Place each specimen on its side while making up others. If for any reason there are wrinkles in the specimen or if it is not tear-shaped, the specimen is to be discarded and another made to replace it.

Method of Test

The Instron Tensile Testing machine is used in running this test. A horizontal platform made of 1/16" thick stainless steel with a polished surface is fitted into the power driven grip. The stationary grip is set two inches above the horizontal platform. The speed upward is 50 inches per minute with a one and a half inch power stroke. The speed downward is 12 inches per minute. Chart speed is 2 inches per minute.

The test specimen is placed in the stationary grip using the masking tape as a guide to place it evenly. Start the chart and push the up button. The platform will rise, make contact with the specimen and only the weight of the specimen is used to promote adhesion. When done properly one square inch of the specimen will be in contact with the platform at the end of the stroke. The red gauge length light will come on at the end of this stroke. When it lights immediately press the down button and the tack value will be recorded.

While in accordance with the patent statutes, a preferred embodiment and best mode has been presented, the scope of the invention is not limited thereto, but rather is measured by the scope of the attached claims.

What is claimed is:

1. A laminate comprising two surfaces spaced apart by an adhesive composition and held in that relationship by a bond between said surfaces and said adhesive, which comprises a mixture on a weight basis of an acrylic adhesive composition, 1 to 10 percent of an organic tin compound and 1 to 10 percent of an organic silicone of the formula

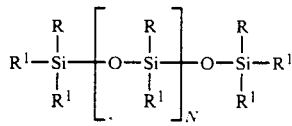

where $R^1$ and R are alkyl, cycloalkyl and aryl groups with the proviso that $R^1$ and R groups can be the same or different and N has a value of about 10 to 10,000.

2. The laminate of claim 1 wherein the adhesive is a pressure sensitive adhesive.

3. The laminate of claim 1 wherein the $R^1$ group of the silicone is methyl.

4. The laminate of claim 1 where the two surfaces are faces of a slit in a cellular foamed insulation member.

5. The laminate of claim 4 wherein the adhesives are on each face of the slit and held apart by a removable release member.

6. The laminate of claim 1 wherein the two surfaces containing the adhesive are initially positioned on each side of a slit in an insulation member and the adhesive is brought into contact by moving one surface with its adhesive across said slit to rest said adhesive on said surface in juxtaposition on adhesive on the other surface.

* * * * *